United States Patent

Basavanhally et al.

[11] Patent Number: 5,345,323
[45] Date of Patent: Sep. 6, 1994

[54] TECHNIQUES FOR POLISHING OPTICAL FIBER ENDS

[75] Inventors: Nagesh R. Basavanhally, Trenton; Richard Borutta, both of Trenton, N.J.; Edward W. Jekkal, Yardley, Pa.

[73] Assignee: AT&T Bell Laboratories, Murray Hill, N.J.

[21] Appl. No.: 108,523

[22] Filed: Aug. 2, 1993

[51] Int. Cl.$^5$ .......................... G02B 6/26; B65H 69/02; B24B 1/00

[52] U.S. Cl. ......................................... 385/59; 385/76; 385/77; 385/80; 385/81; 385/85; 385/62; 385/136; 385/137; 385/139; 156/158; 451/41; 451/28

[58] Field of Search ........................ 385/59, 62, 65, 66, 385/69, 70, 71, 72, 76, 78, 80, 81, 83, 84, 85, 114, 136, 137, 139, 147; 156/158, 159, 160; 51/283 R, 217 R, 209 R, 4, 24, 281 R

[56] References Cited

U.S. PATENT DOCUMENTS

| | | | |
|---|---|---|---|
| 4,046,454 | 9/1977 | Pugh, III | 385/59 X |
| 4,362,356 | 12/1982 | Williams et al. | 385/80 X |
| 4,746,194 | 5/1988 | Rasmussen | 385/85 X |
| 4,818,058 | 4/1989 | Bonanni | 385/83 X |
| 4,818,059 | 4/1989 | Kakii et al. | 385/83 X |
| 4,830,456 | 5/1989 | Kakii et al. | 385/59 X |
| 4,998,796 | 3/1991 | Bonanni et al. | 385/83 X |
| 5,121,459 | 6/1992 | Chiang | 385/114 X |
| 5,127,084 | 6/1992 | Takahashi | 385/114 X |
| 5,135,590 | 8/1992 | Basavanhally et al. | 385/137 X |
| 5,185,846 | 2/1993 | Basavanhally et al. | 385/137 |
| 5,216,741 | 6/1993 | Blijleven et al. | 385/137 |

FOREIGN PATENT DOCUMENTS

| | | | |
|---|---|---|---|
| 59-93402 | 5/1984 | Japan | 385/85 X |
| 1425264 | 2/1976 | United Kingdom | 385/85 X |

OTHER PUBLICATIONS

V. Billig, "Flexures," in *Machine Design*, Feb. 4, 1960, pp. 114–119.

*Primary Examiner*—Brian Healy
*Attorney, Agent, or Firm*—Roderick B. Anderson

[57] ABSTRACT

Optical fibers (15) are supported within a bonded support member (16) having along opposite sides first and second grooves (14) which are parallel to the central axes of the fibers being supported. A first opening (22) is formed in a holder member (21) which includes a first projection (27). A cantilever spring member (23) is formed in the holder member having a second projection (27) opposite the first projection. The bonded fiber support member (16) is inserted into the opening such that the first projection engages the first groove (14) on one side, and the second projection engages the second groove (14) on the other side of the bonded support member. Thereafter, the bonded support member is locked into position and the holder biases one end of it against a polishing wheel (29) to permit polishing along a plane which is perpendicular to the axes of the optical fibers. By making the grooves in the support member by photolithographic masking and etching, and by making the projections in the holder by electron discharge machining, one can assure great alignment accuracy. The cantilever spring is preferably made by electron discharge machining to be part of a monolithic holder member and is made to exert a sufficient bias to hold the support member temporarily in place. Thereafter, the support member is locked in place by biasing a coil spring (28) against it. This use of spring bias means for holding the support member in the holder permits sufficient force to be exerted on the support members to permit polishing, but without risking cracking them.

12 Claims, 2 Drawing Sheets

TECHNIQUES FOR POLISHING OPTICAL FIBER ENDS

TECHNICAL FIELD

This invention relates to optical fiber connectors and, more particularly, techniques for polishing the ends of optical fibers of an array.

BACKGROUND OF THE INVENTION

The Bonanni U.S. Pat. No. 4,818,058, granted Apr. 4, 1989, incorporated herein by reference, describes an optical fiber connector that can be used for splicing or interconnecting two optical fiber arrays. The connector comprises two opposed chips in which matching V-grooves have been made for supporting individual fibers of an array. The chips are of a monocrystalline material such as silicon in which the V-grooves are made by photolithographic masking and etching with an extremely high degree of precision. After corresponding parallel V-grooves have been made in two chips, the array of optical fibers is sandwiched between them, with each fiber being supported in matching V-grooves of the two chips. The chips are bonded together, and the protruding fiber ends are polished, for example, by abutting them against a polishing wheel. Thereafter, the free ends of two such connectors can be abutted to splice or interconnect the optical fibers of two fiber ribbons, each ribbon defining a fiber array.

Efforts to automate the polishing step have proven difficult because of the need for holding the supported optical fiber exactly perpendicularly with respect to the polishing wheel. The silicon chip support members are rather fragile, so care must be taken not to exert too much force on them. There has therefore developed a need for a method for expediently polishing the ends of optical fiber connectors such that all of the fibers are polished to a common plane which is precisely perpendicular to their central axes. Such methods should require a minimum of operator skill, be consistent with modern robotic apparatus, and not damage the connector devices.

SUMMARY OF THE INVENTION

In accordance with one embodiment of the invention, optical fibers are supported within a bonded support member having along opposite sides first and second grooves which are parallel to the central axes of the fibers being supported. A first opening is formed in a holder member which includes a first projection. A cantilever spring member is formed in the holder member having a second projection opposite the first projection. The bonded fiber support member is inserted into the opening such that the first projection engages the first groove on one side, and the second projection engages the second groove on the other side of the bonded support member. Thereafter, the bonded support member is locked into position and the holder biases one end of it against a polishing wheel to permit polishing along a plane which is perpendicular to the axes of the optical fibers.

By making the grooves in the support member by photolithographic masking and etching, and by making the projections in the holder by electron discharge machining, one can assure great alignment accuracy. The cantilever spring is preferably made by electron discharge machining to be part of a monolithic holder member and is made to exert a sufficient bias to hold the support member temporarily in place. Thereafter, the support member is locked in place by biasing a coil spring against it. This use of spring bias means for holding the support member in the holder permits sufficient force to be exerted on the support members to permit polishing, but without risking cracking them.

These and other objects, features and benefits of the invention will be better understood from a consideration of the following detailed description taken in conjunction with the accompanying drawing.

DETAILED DESCRIPTION

Figure 1:
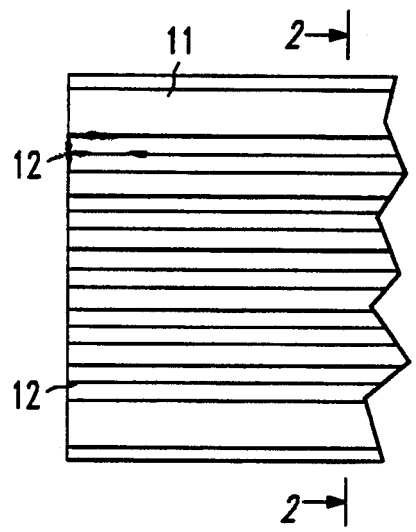
FIG. 1 is a top view of part of a support member for supporting optical fibers.
Figure 2:
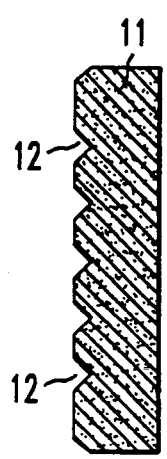
FIG. 2 is a view taken along lines 2—2 of FIG. 1.

The drawings are not necessarily to scale; distortions and simplifications have been made for the purpose of clarity of exposition. Referring now to FIGS. 1 and 2, there is shown a portion of an optical fiber support member 11 within which an array of parallel V-grooves 12 have been formed for the purpose of supporting optical fibers. As described in the aforementioned Bonanni patent, the support member 11 is of a monocrystalline material such as silicon, which permits the formation of V-grooves 12 by photolithographic masking and etching with an extremely high degree of precision. That is, the grooves are made by forming over the upper surface of the member a mask which exposes areas in which the V-grooves are to be etched. Exposure to an appropriate etchant then causes anisotropic etching along planes defined by the crystal structure of the support member 11 so as to form characteristic V-grooves.

Figure 3:
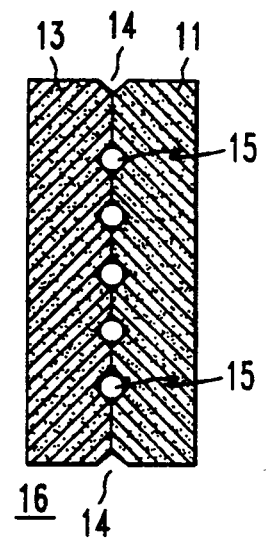
FIG. 3 is a sectional view of a bonded support member for supporting an array of optical fibers.

Referring to FIG. 3, two such support members 11 and 13 are made to have a plurality of identical parallel V-grooves along upper surfaces. Optical fibers 15 are then sandwiched between opposite V-grooves and securely held in place. The support elements 11 and 13 are bonded together to form a bonded support member 16. The optical fibers are typically only about one hundred twenty-five microns in diameter. Because of the precision with which the V-grooves are made, the position and alignment of the optical fibers 15 is quite precise, with all of them being precisely parallel. The two support members 11 and 13 are further made to define V-grooves 14, made by photolithographic masking and anisotropic etching, on opposite end surfaces of the bonded support member 16 for aiding in aligning the bonded support member.

Figure 4:
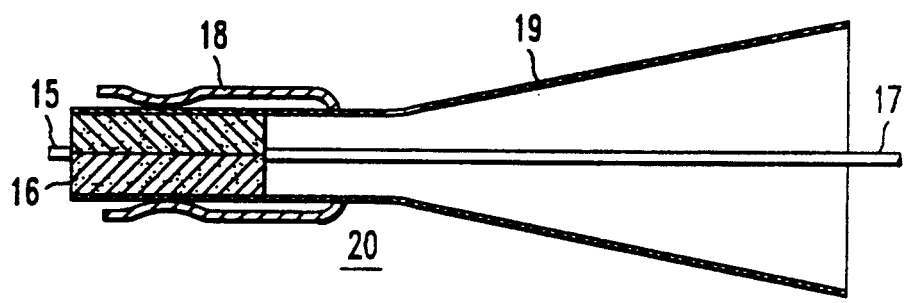
FIG. 4 is a sectional view of an optical fiber connector part.

FIG. 4 shows a completed optical fiber connector part 20. The component optical fibers 15 supported by connector 20 are typically part of an optical fiber ribbon 17, which comprises a plastic encapsulation for keeping the fibers in a linear array. The end portion of the plastic encapsulation is removed prior to fiber insertion into the bonded support member 16. A spring clip 18 provides additional mechanical support for the structure, and a flared plastic sleeve portion 19 prevents undue acute bending of the optical fiber ribbon 17. Completion of the connector part requires precision polishing to make the free ends of fibers 15 flush with bonded support member 16.

Figure 5:
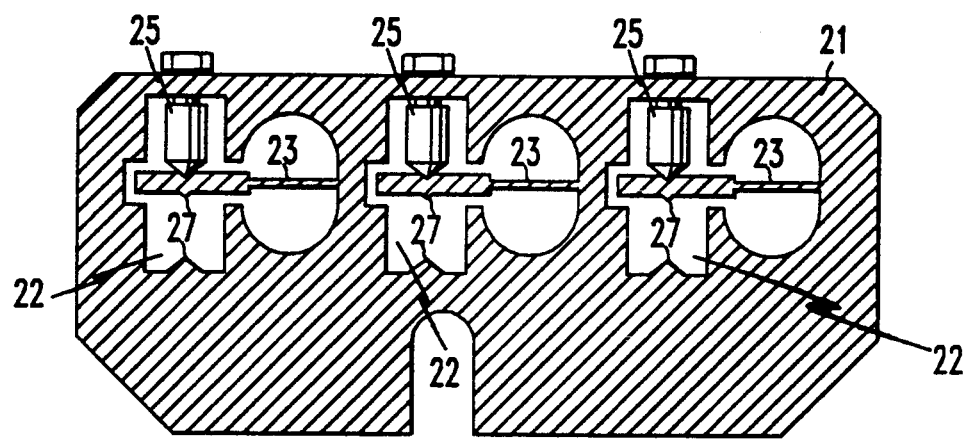
FIG. 5 is a sectional view of a holder member in accordance with one embodiment of the invention.

Referring to FIG. 5, in accordance with the invention, a holder member 21 is made using electron discharge machining to define identical openings 22 and identical cantilever spring members 23. The holder member 21 is initially a solid member, and all of the openings shown are cut from it by electron discharge machining, a known process in which an electrical wire forms an electrical discharge that cuts through metal; see e.g., "Nontraditional Manufacturing Processes," by G. F. Benedict, *Marcel Dekker, Inc.* New York and Basel, Switzerland, pp. 231–245. The workpiece is moved with respect to the electrical discharge such that the discharge cuts the workpiece in the manner of a jigsaw. The openings defined separate the spring 23 sufficiently from the holder that the free end of cantilever spring 23 can be displaced. Threaded holes are also made in the member to allow spring loaded screws 25 to engage the cantilever springs 23.

Figure 6:
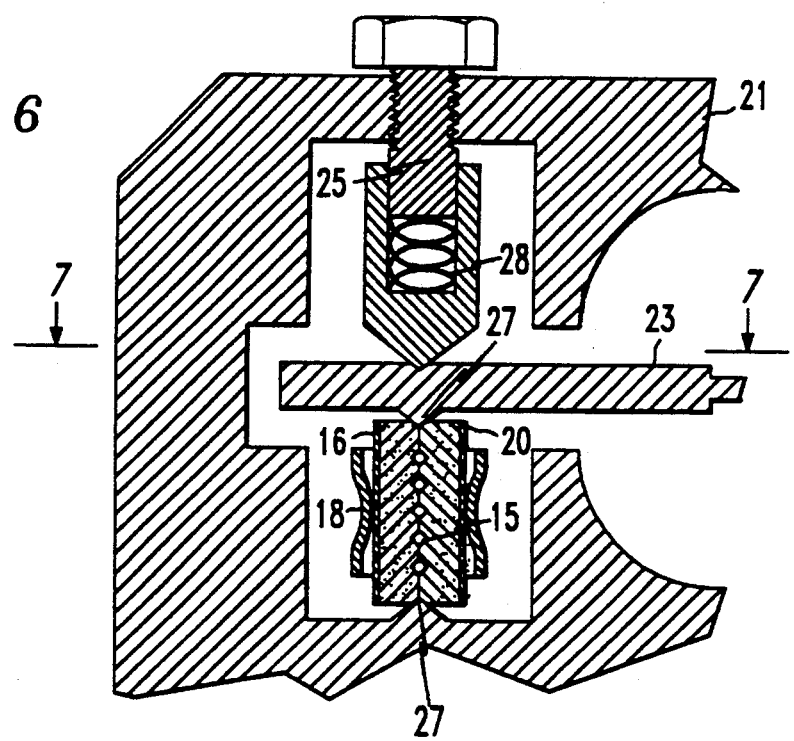
FIG. 6 is an enlarged view of part of the holder member of FIG. 5, holding a bonded support member.
Figure 7:
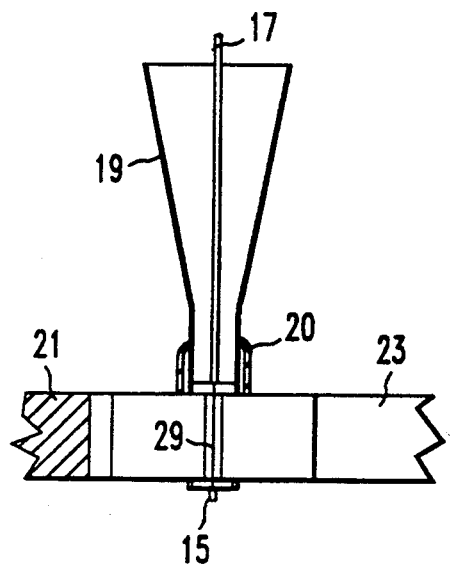
FIG. 7 is a view taken along lines 7—7 of FIG. 6.

Each of the openings 22 is made to receive an optical fiber connector 20 of the type shown in FIG. 4. Each of the openings 22 and each of the cantilever springs is made to have a projection 27, which is adapted to engage a V-shaped groove 14 shown in FIG. 3. The enlarged sectional view of FIG. 6 shows a connector 20 being supported between opposite projections 27. The distance between opposite projections 27 is made to be slightly smaller than the distance between opposite grooves 14 of FIG. 3 so that, when the connector is inserted in the holder, the cantilever spring 23 is slightly deflected and exerts a small spring bias on it to allow it to be temporarily held in position. As shown in FIG. 7, the optical fiber connector 20 is inserted such that optical fiber ends 15 protrude beyond the surface of holder 21, as is needed to permit them to be polished.

After the connectors have been properly inserted in holder 21, they are locked in place by spring loaded screws 25. Each of the spring loaded screws comprises a coil spring 28 that exerts a spring bias against one surface of the cantilever spring 23 as is shown in FIG. 6. Each spring loaded screw has a V-shaped end that engages a V-shaped recess 29 in cantilever spring 23 as shown in FIG. 7. The length of the threaded portion of screw 25 is limited to give a maximum downward force on the coil spring of, for example, one pound; after screw 25 has been screwed in the maximum distance, it is stopped by abutment of the screw head on holder member 21.

Figure 8:
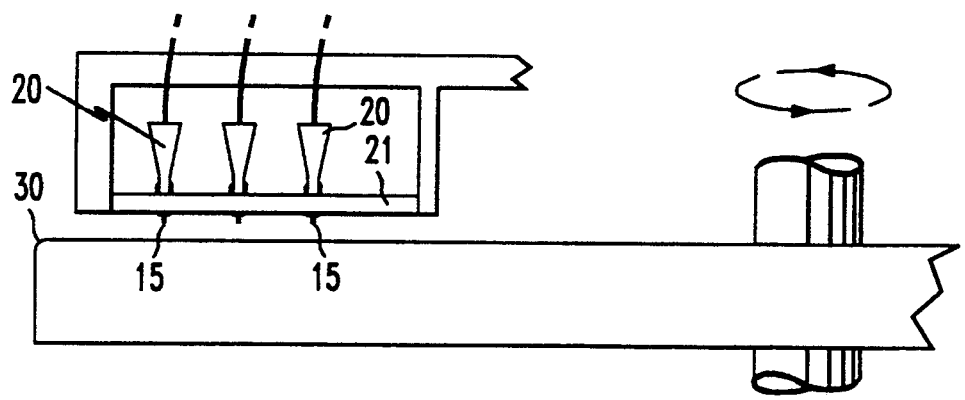
FIG. 8 is a view showing how the holder member of FIG. 5 can be used to hold optical fiber arrays for polishing in accordance with one embodiment of the invention.

Referring to FIG. 8, the holder 21, with three optical fiber connectors 20 mounted in it, is held by a bracket in proximity to a rotatable polishing wheel 30. When the ends of the connectors 20 contact the rotating polishing wheel, the ends of fibers 15 are polished along a common horizontal plane. Preferably, the polishing extends into the silicon bonded support member so that it too is polished to a plane that is flush with the ends of the optical fibers 15. As can be seen, the holder 21 permits the fibers of three connectors 20 to be polished simultaneously. Further, two, three or more holders 21 can be mounted for simultaneous polishing by the same wheel 30.

The holder member 21 has been made from aluminum having a thickness of 4.15 millimeters. The thicker end portion of each cantilever spring had a thickness of 1.65 millimeters and a length of 9.1 millimeters. The thinner portion of the cantilever spring had a thickness of 0.36 millimeters. The width of the cantilever spring was 4.15 millimeters and its total length was 18.65 millimeters. Since the cantilever spring and other elements are made of a single monolithic member, the spring movements result from flexure of portions of that member. This avoids problems such as nonlinearities, hysteresis and relative motion of different parts, as are encountered if several parts are used for making a device. As a consequence, the forces exerted on the optical fiber connectors are highly uniform and reliable. We have found that excessive forces can damage or crack the silicon portions of the optical fiber connector. Using the coil spring 28 to lock the connector in place allows for absorption of forces during the polishing process without risking damage.

The use of electron discharge machining to make the holders 21 and the various parts of it assure that the optical fiber connectors can be held in precisely perpendicular positions with respect to the polishing wheel. The holders 21 are easy to make and are easy to use. In fact, conventional robots are used for manipulating the holders 21 with respect to the polishing wheel. It can be seen that insertion of the optical fiber connectors in the holder 21 is easy and that operator skill is minimized. After polishing, the ends of each array are located precisely on a common plane perpendicular to the fiber central axis and are therefore suitable for abutment against a fiber array of another connector as required for practical splicing or interconnection, as is known.

While the invention has been discussed in the context of a specific kind of silicon optical fiber connector, it is clear that the invention can be used with connectors made of other materials. Projections 27 may each be in the shape of a cylindrical section, which is capable of engaging V-shaped recesses with the same precision as V-shaped projections. Other embodiments and modifications may be made by those skilled in the art without departing from the spirit and scope of the invention.

We claim:

1. A method for polishing ends of an array of optical fibers to make them suitable for interconnection with another array comprising the steps of:

forming a plurality of corresponding V-grooves in first and second support members;

supporting portions of each optical fiber of the array within opposite V-grooves of the first and second support members, and bonding the first and second support members together to form a bonded support member;

said bonded support member defining first and second grooves on opposite surfaces thereof extending in the same direction as said parallel V-grooves;

holding said bonded support member such that optical fibers supported therein are perpendicular to a surface of a polishing wheel; and rotating the polishing wheel and contacting ends of the optical fiber to the polishing wheel to polish them to a common plane;

wherein the improvement comprises the steps of:

forming in a holder member a first opening including a first projection;

forming in the holder member a cantilever spring member having therein a second projection;

inserting the bonded support member into the first opening such that the first projection engages the first groove and the second projection engages the second groove; and thereafter locking the bonded support member within the first opening to permit polishing of the optical fiber.

2. The method of claim 1 wherein:

the support members are made of monocrystalline material; and the V-grooves and said first and second grooves are made by photolithographic masking and etching.

3. The method of claim 1 wherein:

a plurality of openings are made in the holder, each being substantially identical to the first opening; and a bonded support member containing optical fibers is inserted into each of said openings to permit simultaneous polishing of a plurality of optical fiber arrays.

4. The method of claim 1 wherein:

said first opening and said cantilever spring member are made in a single monolithic metal member by electron discharge machining.

5. The method of claim 1 wherein:

the locking step comprises the step of biasing a coil spring against said cantilever spring.

6. A method for simultaneously polishing the ends of a plurality of optical fiber connectors comprising the steps of:

forming in a holder member a plurality of openings each including a first projection;

forming in the holder member a plurality of cantilever spring members each having thereon a second projection, each cantilever spring member extending into an opening;

inserting an optical fiber connector into each of the openings such that the first projection engages a first groove of the connector and the second projection engages a second groove of the connector, the insertion deflecting said cantilever spring, whereby said cantilever spring exerts a force on said optical fiber connector;

locking each optical fiber connector into position within an opening; and simultaneously polishing one end of all of said optical fiber connectors with a rotating polishing wheel.

7. The method of claim 6 wherein:

said openings and said cantilever spring members are made in a single monolithic metal member by electron discharge machining.

8. The method of claim 7 wherein:

each of said connectors is locked within an opening of the holder by biasing a coil spring against the cantilever spring which contacts such connector.

9. The method of claim 8 wherein:

the biasing step comprises the step of making threads in the holder and using a screw member that engages the threads to contact the coil spring and bias it against the cantilever spring.

10. The method of claim 9 wherein:

the connectors comprise silicon elements for containing therebetween optical fibers to be polished; and the grooves engaged by said first and second projections are made in said silicon elements by photolithographic masking and etching.

11. The method of claim 10 wherein:

the force exerted on each of said optical fiber connectors does not exceed one pound.

12. The method of claim 11 wherein:

a V-shaped recess is made in the cantilever spring; and the coil spring biases a projection against the V-shaped recess.

* * * * *